United States Patent
Saito et al.

[11] Patent Number: 5,883,194
[45] Date of Patent: Mar. 16, 1999

[54] POLYCARBONATE OR POLYESTERCARBONATEL ACRYLIC RESIN OR METHACRYLIC/RESIN/CATALYST COMPOSITION

[75] Inventors: Akihiro Saito; Takashi Nagai, both of Utsunomiya; Takuro Kitamura, Moka, all of Japan; Wie-Hin Pan, Evansville, Ind.; Patrick McCloskey, Waterviliet, N.Y.

[73] Assignee: General Electric Company, Pittsfield, Mass.

[21] Appl. No.: 900,069

[22] Filed: Jul. 24, 1997

Related U.S. Application Data

[63] Continuation of Ser. No. 629,257, Apr. 8, 1996, abandoned.

[30] Foreign Application Priority Data

Apr. 8, 1995 [JP] Japan .................................... 7-108321

[51] Int. Cl.$^6$ ............................ C08L 69/00; C08L 33/12; C08G 64/18; C08G 81/00
[52] U.S. Cl. ............................. 525/148; 525/90; 524/114
[58] Field of Search ............................. 524/114; 525/90, 525/148

[56] References Cited

U.S. PATENT DOCUMENTS

| | | |
|---|---|---|
| 3,027,814 | 4/1962 | Schnellmann . |
| 3,028,365 | 4/1962 | Schnell et al. . |
| 3,030,331 | 4/1962 | Goldberg . |
| 3,153,008 | 10/1964 | Fox et al. . |
| 3,169,121 | 2/1965 | Goldberg . |
| 3,275,601 | 9/1966 | Schnell et al. . |
| 3,334,154 | 8/1967 | Kim et al. . |
| 3,915,926 | 10/1975 | Wambach . |
| 4,188,314 | 2/1980 | Fox et al. ................................ 525/433 |
| 4,319,003 | 3/1982 | Gardlund ................................ 525/148 |
| 4,743,654 | 5/1988 | Kyu ........................................ 525/148 |

FOREIGN PATENT DOCUMENTS

| | | |
|---|---|---|
| 0 036 127 A1 | 9/1981 | European Pat. Off. . |
| 0 298 214 A2 | 1/1989 | European Pat. Off. . |
| 0 483 717 A2 | 5/1992 | European Pat. Off. . |

*Primary Examiner*—David Buttner

[57] ABSTRACT

A thermoplastic resin composition having improved transparency and containing polycarbonate resin and/or polyester carbonate resin and acrylic resin and/or methacrylic resin comprises A) (a) polycarbonate resin and/or (b) polyester carbonate resin and B) acrylic resin and/or methacrylic resin, having 0.000005–0.5 parts by weight of C) a basic compound catalyst and/or acidic compound catalyst added with respect to a total of 100 parts by weight of the aforementioned components A) and B).

45 Claims, No Drawings

POLYCARBONATE OR POLYESTERCARBONATEL ACRYLIC RESIN OR METHACRYLIC/RESIN/CATALYST COMPOSITION

This is a continuation of application Ser. No. 08/629,257 filed on Apr. 8, 1996 now abandoned.

The present invention relates to a thermoplastic resin composition having polycarbonate and methacrylate resin (or acrylic resin) as its main components, in which transparency is improved by adding small amounts of a catalyst to the resin blend.

Generally speaking, resin compositions composed of polycarbonate and polymethyl methacrylate are not transparent, but are non-transparent resins having a pearly luster (Japanese Patent Application Publication No. 68-13384).

The reason why such resins are not transparent is considered to be that in the ordinary melt kneading process, independent phases are individually formed (incompatible blend) having different refractive indexes (PC: 1.58, PMMA: 1.49).

The present invention improves on such problem areas of prior art by providing a thermoplastic resin composition with improved transparency which contains polycarbonate resin and/or polyester carbonate resin and acrylic resin and/or methacrylic resin.

As a result of thorough research conducted in order to solve these problems, it was expected that by adding a catalyst to polycarbonate and polymethyl methacrylate and carrying out hot melt kneading, the reaction between polycarbonate and polymethyl methacrylate could be accelerated, thus increasing compatibility and improving transparency.

As a result of this research, it was discovered that a composition obtained in this manner showed the desired effect of improving transparency.

The present invention solves this problem by comprising a thermoplastic resin composition containing A) (a) polycarbonate resin and/or (b) polyester carbonate resin and B) acrylic resin and/or methacrylic resin, with C) a basic compound catalyst and/or acidic compound catalyst being added in the amount of 0.000005–0.5 parts by weight with respect to a total of 100 parts by weight of the above-mentioned components A) and B).

In this case, there are no limits on the type of (a) polycarbonate resin used, with an appropriate example being polycarbonate in which the equivalent ratio of phenolic terminal groups (I) to non-phenolic terminal groups (II) is 1/19 or above.

The polycarbonate used (Component A) (a)) may be an aromatic homo- or copolycarbonate manufactured by reacting bivalent phenol with a carbonate precursor.

Moreover, the polycarbonate of the present invention may be branched. This type of branched polycarbonate may be obtained as a branched thermoplastic polycarbonate manufactured by reacting a polyfunctional aromatic compound with bivalent phenol and a carbonate precursor.

The method of manufacturing the polycarbonate of the present invention is well known in and of itself, with known methods including synthesis of polycarbonate by an ester exchange reaction of bivalent phenol and a carbonic acid diester in a molten state, and the method of reacting bivalent phenol and phosgene in a molten state (particularly the surface method).

Adjustment of the equivalent ratio of the terminal groups in the polycarbonate may be easily carried out by altering the ratio of the bivalent phenol and carbonic acid diester used as raw materials in manufacturing the polycarbonate by melt polymerization.

For example, when bisphenol A is used as an aromatic dihydroxy compound and diphenyl carbonate is used as a carbonic acid diester, the polycarbonate terminal groups are phenolic residues originating from the bisphenol A and phenyl groups originating from the diphenyl carbonate, and when the molar ratio of bisphenol A is increased, the equivalent ratio of the phenolic terminal groups (I) and non-phenolic terminal groups (II) in the polycarbonate produced (I)/(II)) is high.

There are no particular restrictions on the aromatic dihydroxy compound, with a variety of commonly-known compounds being suitable for use. Examples include compounds having the following formula:

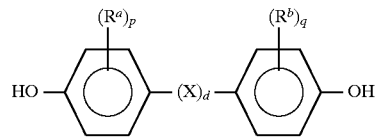

where $R^a$ and $R^b$ are individual halogens or monovalent hydrocarbon groups, X is $-C(R^c)(R^d)-$, $-C(=R^e)-$, $-O-$, $-S-$, $-SO-$, or $-SO_2-$, $R^c$ and $R^d$ are individual hydrogen atoms or monovalent hydrocarbon groups, $R^e$ is a bivalent hydrocarbon group, p and q are individual integers from 0–4, and d is the integer 0 or 1, such as a bis(hydroxyaryl)alkane including bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 2,2-bis(4-hydroxy-3-methylphenyl)propane, 2,2-bis(4-hydroxy-t-3,5-dimethylphenyl)propane, or 1,1-bis(4-hydroxy-t-butylphenyl)propane; a bis(hydroxyaryl)cycloalkane such as 1,1-bis(4-hydroxyphenyl)cyclopentane, or 1,1-(4-hydroxyphenyl)cyclohexane; a dihydroxyaryl ether such as 4,4'-dihydroxydiphenyl ether or 4,4'-dihydroxy-3,3'-dimethyldiphenyl ether; a dihydroxydiaryl sulfide such as 4,4'-dihydroxydiphenyl sulfide or 4,4'-dihydroxy-3,3'-dimethylphenyl sulfide; a dihydroxydiaryl sulfoxide such as 4,4'-dihydroxydiphenyl sulfoxide or 4,4'-dihydroxy-3,3'-dimethyldiphenyl sulfoxide; a dihydroxydiaryl sulfone such as 4,4'-dihydroxydiphenyl sulfone or 4,4'-dihydroxy-3,3'-dimethyldiphenyl sulfone, or 4,4'-bisphenol, etc., but the compound is not limited to the above. Among these compounds, the use of 2,2-bis(4-hydroxyphenyl)propane is particularly preferred. In addition to the above, as the aromatic dihydroxy compound, one may also use a compound having the following general formula:

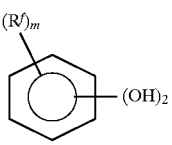

where $R^f$ indicates individual hydrocarbon groups having 1–10 carbon atoms or their halogen compounds or halogen atoms and m is an integer from 0 to 4, such as resorcinol and substituted resorcinol, including 3-methylresorcinol, 3-ethylresorcinol, 3-propylresorcinol, 3-butylresorcinol, 3-t-butylresorcinol, 3-phenylresorcinol, 3-cumylresorcinol, 2,3,4,6-tetrafluororesorcinol, or 2,3,4,6-tetrabromoresorcinol; catechol; or hydroquinone or a substituted hydroquinone such as 3-methylhydroquinone, 3-ethylhydroquinone, 3-propylhydroquinone, 3-butylhydroquinone, 3-t-butylhydroquinone, 3-phenylhydroquinone, 3-cumylhydroquinone, 2,3,5,6-tetramethylhydroquinone, 2,3,5,6-tetra-t-butylhydroquinone, 2,3,5,6-tetrafluorohydroquinone, or 2,3,5,6-tetrabromohydroquinone, etc., or a compound such as 2,2,2',2'-tetrahydro-3,3,3',3'-tetramethyl-1,1'-spirobi[1H-indene]-7,7'-diol having the following formula:

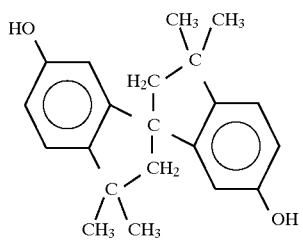

These aromatic dihydroxy compounds may be used alone or in combinations of two or more.

There are also no particular limitations on the carbonic acid diester used in the present invention, with examples including diphenyl carbonate, ditolyl carbonate, bis(chlorophenyl)carbonate, m-cresyl carbonate, dinaphthyl carbonate, bis(diphenylyl)carbonate, diethyl carbonate, dimethyl carbonate, dibutyl carbonate, or dicyclohexyl carbonate, but the substance is not limited to these. Diphenyl carbonate should preferably be used.

These carbonic acid esters may also be used alone or in combinations of two or more.

The aforementioned carbonic acid diester may contain a dicarboxylic acid or a dicarboxylic acid ester. Examples of this dicarboxylic acid or carboxylic acid ester include aromatic carboxylic acids such as terephthalic acid, isophthalic acid, diphenyl terephthalate, or diphenyl isophthalate; aliphatic dicarboxylic acids such as succinic acid, glutaric acid, adipic acid, pimelic acid, suberic acid, azelaic acid, sebacic acid, decanedioic acid, dodecanedioic acid, diphenyl sebacate, diphenyl decanedioate, or diphenyl dodecanedioate; and aliphatic dicarboxylic acids such as dichloropropanedicarboxylic acid, 1,2-cyclopropanedicarboxylic acid, 1,3-cyclobutanedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, diphenyl cyclopropanedicarboxylate, diphenyl 1,2-cyclobutanedicarboxylate, diphenyl 1,3-cyclobutanedicarboxylate, diphenyl 1,2-cyclopentanedicarboxylate, diphenyl 1,3-cyclopentanedicarboxylate, diphenyl 1,2-dicyclohexanedicarboxylate, diphenyl 1,3-cyclohexanedicarboxylate, or diphenyl 1,4-cyclohexanedicarboxylate.

These dicarboxylic acids or dicarboxylic acid esters may be used alone or in combinations of two or more. The dicarboxylic acid or carboxylic acid ester should be contained in the aforementioned carbonic acid diester in an amount of 50 mole % or less, and preferably 30 mole % or less.

In manufacturing polycarbonate, together with the aromatic dihydroxy compound and carbonic acid diester, a polyfunctional compound having three or more functional groups per molecule may also be used. A compound having a phenolic hydroxyl group or a carboxyl group should preferably be used as this polyfunctional compound, with compounds containing three phenolic hydroxyl groups being particularly preferred.

Specific examples of the preferred compound include 1,1,1-tris(4-hydroxyphenyl)ethane, 2,2',2"-tris(4-hydroxyphenyl)diisopropylbenzene, α-methyl-α,α',α'-tris(4-hydroxyphenyl)-1,4-diethylbenzene, α,α',α"-tris(4-hydroxyphenyl)-1,3,5-triisopropylbenzene, phloroglucinol, 4,6-dimethyl-2,4,6-tris(4-hydroxyphenyl)-2-heptane [sic], 1,3,5-tris(4-hydroxyphenyl)benzene, 2,2-bis[4,4-(4,4'-dihydroxyphenyl)cyclohexyl]propane, trimellitic acid, 1,3,5-benzenetricarboxylic acid, and pyromellitic acid.

The use of 1,1,1-tris(4-hydroxyphenyl)ethane or α,α',α"-tris(4-hydroxyphenyl)-1,3,5-triisopropylbenzene, etc., is particularly preferred. The polyfunctional compound should preferably be present in the amount of 0.03 moles or less with respect to 1 mole of the aromatic dihydroxy compound, and more preferably in the amount of 0.001–0.02 moles, with 0.001–0.01 moles being particularly preferred.

Moreover, in manufacturing the polycarbonate, one may also use a compound in which one or more terminal group has the following formula:

  (1)

  (2)

  (3)

  (4)

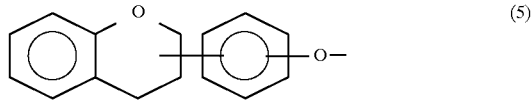  (5)

where the aromatic ring or chromanyl group may be substituted with a halogen or an alkyl group having 1–9 carbon atoms can be introduced.

Examples of the compound of (1) in which the hydroxyl group can be introduced include diol compounds such as bisphenol A. Moreover, one can also mention phenol, diphenyl carbonate, etc., as examples of the compound of (2) in which a phenoxy group can be introduced; p-t-butylphenol, p-t-butylphenyl phenyl carbonate, p-t-butylphenyl carbonate, etc., as examples of the compound of (3) in which a p-t-butylphenoxy group may be introduced; and p-cumylphenol, p-cumylphenyl phenyl carbonate, p-cumylphenyl carbonate, etc., as examples of the compound of (4) in which a p-cumylphenoxy group (p-phenylisopropylphenoxy group) may be introduced. One can mention a chromanyl group, etc., having the following formula:

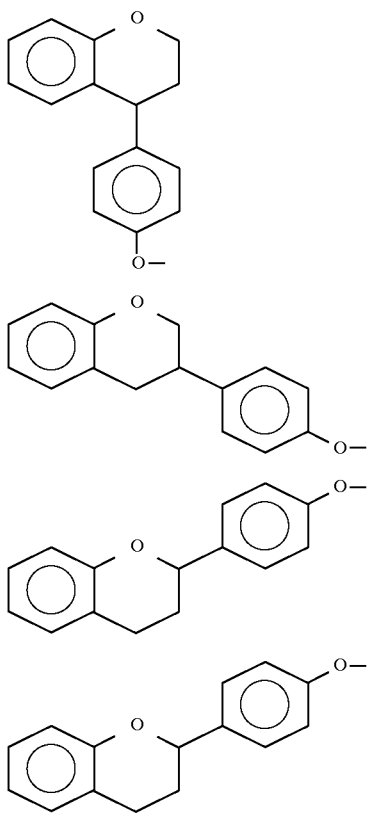

as an example of the chromanylphenoxy group of (5) in the above formula. The following can be mentioned as examples of the compound in which the group of (5-1) may be introduced: 2,2,4-trimethyl-4-(4-hydroxyphenyl)chroman, 2,2,4,6-tetramethyl-4-(3,5-dimethyl-4-hydroxyphenyl) chroman, 2,3,4-trimethyl-2-ethyl-4-(3-nonyl-4-hydroxyphenyl)-7-nonylchroman, 2,2,4-trimethyl-4-(3,5-diethyl-4-hydroxyphenyl)-6-ethylchroman, 2,2,4,6,8-pentamethyl-4-(3,5-dimethyl-4-hydroxyphenyl)chroman, 2,2,4-triethyl-3-methyl-4-(4-hydroxyphenyl)chroman, 2,2,4-trimethyl-4-(3-bromo-4-hydroxyphenyl)chroman, 2,2,4-trimethyl-4-(3 -bromo-4-hydroxyphenyl)-6-bromochroman, 2,2,4-trimethyl-4-(3,5-dibromo4-hydroxyphenyl)-6-bromochroman, 2,2,4-trimethyl-4-(3,5-dibromo-4-hydroxyphenyl)-6,8-dibromochroman, etc., and of these substances, 2,2,4-trimethyl-4-(4-hydroxyphenyl)chroman is particularly preferred; examples of the compound in which the base of (5-2) may be introduced include 2,2,3-trimethyl-3-(4-hydroxyphenyl)chroman, 2,2,3,6-tetramethyl-3-(3,5-dimethyl-4-hydroxyphenyl)chroman, 2,3,4-trimethyl-2-ethyl-3-(3-nonyl-4-hydroxyphenyl)-7-nonylchroman, 2,2,3-trimethyl-3-(3,5-diethyl-4-hydroxyphenyl)-6-ethylchroman, 2,2,3,6,8-pentamethyl-3-(3,5-dimethyl-4-hydroxyphenyl) chroman, 2,2,3-triethyl-3-methyl-3-(4-hydroxyphenyl) chroman, 2,2,3-trimethyl-3-(3-bromo-4-hydroxyphenyl)-6-bromochroman, 2,2,3-trimethyl-3 -(3,5-dibromo-4-hydroxyphenyl)-6-bromochroman, 2,2,3-trimethyl-3-(3,5-dibromo-4-hydroxyphenyl)-6,8-dibromochroman, etc., with 2,2,3-trimethyl-3-(4-hydroxyphenyl)chroman being preferred; examples of the compound in which the group of (5-3) may be introduced include 2,4,4-trimethyl-2-(2-hydroxyphenyl)chroman, 2,4,4,6-tetramethyl-2-(3,5-dimethyl-2-hydroxyphenyl)chroman, 2,3,4-trimethyl-4-ethyl-2-(3,5-dimethyl-2-hydroxyphenyl)-7-nonylchroman, 2,4,4-trimethyl-2-(3,5-dimethyl-2-hydroxyphenyl)-6-ethylchroman, 2,4,4,6,8-pentamethyl-2-(3,5-dimethyl-2-hydroxyphenyl)-6-ethylchroman, 2,4,4-trimethyl-2-(3-bromo]-2-hydroxyphenyl)chroman, 2,4,4-trimethyl-2-(3-bromo-2-hydroxyphenyl)-6-bromochroman, 2,4,4-trimethyl-2-(3,5-dibromo-2-hydroxyphenyl)-6-bromochroman, 2,4,4-trimethyl-2-(3,5-dibromo-2-hydroxyphenyl)-6,8-dibromochroman, etc., with 2,4,4-trimethyl-2-2-(hydroxyphenyl)chroman being preferred; examples of compounds in which the group of (5-4) may be introduced include 2,4,4-trimethyl-2-(4-hydroxyphenyl) chroman, 2,4,4,6-tetramethyl-2-(3,5-dimethyl-4-hydroxyphenyl)chroman, 2,4,4-triethyl-2-(4-hydroxyphenyl)chroman, 2,3,4-trimethyl-4-ethyl-2-(3,5-dimethyl-4-hydroxyphenyl)-7-nonylchroman, 2,4,4-trimethyl-2-(3,5-diethyl-4-hydroxyphenyl)-6-ethylchroman, 2,4,4,6,8-pentamethyl-2-(3,5-dimethyl-4-hydroxyphenyl)-6-ethylchroman, 2,4,4-trimethyl-2-(3-bromo-4-hydroxyphenyl)chroman, 2,4,4-trimethyl-2-(3 -bromo-4-hydroxyphenyl)-6-bromochroman, 2,4,4-trimethyl-2-(3,5-dibromo-4-hydroxyphenyl)-6-bromochroman, and 2,4,4-trimethyl-2-(3,5-dibromo-4-hydroxyphenyl)-6,8-dibromochroman, etc., with 2,4,4-trimethyl-2-(4-hydroxyphenyl)chroman being preferred.

The aforementioned aromatic ring or aliphatic ring may be further substituted with a halogen or an alkyl group having 1–9 carbon atoms. These compounds may be used alone or in combinations of two or more.

The carbonic acid diester should preferably be used in the amount of 1.00–1.30 moles, and particularly 1.01–1.20 moles, for each mole of the aromatic dihydroxy compound, and the two substances should preferably be reacted in the presence of a catalyst. The compound disclosed in the Specification of Japanese Laid-Open Patent 2-175368, submitted by the present Applicant, may be used as the catalyst.

The copolyester carbonate resin of Component (A) (b) is known in and of itself, with examples including the specifications of U.S. Pat. Nos. 3,028,365, 3,334,154, 3,275,601, 3,915,926, 3,030,331, 3,169,121, 3,027,814, and 4,188,314.

Generally speaking, manufacturing of copolyester carbonate may be carried out by various processes such as surface polymerization (i.e., boundary separation), ester exchange, solution polymerization, and melt polymerization, but the method of surface polymerization is preferred.

For example, in the preferred process, the reactants are dissolved or dispersed in an appropriate water-insoluble solvent (such as methylene chloride), and while adjusting the pH in the presence of an appropriate catalyst (such as triethylamine) and a caustic aqueous solution (NaOH), the reactants are brought into contact with a carbonate precursor (such as phosgene). The reactants used are an aromatic dihydroxy compound and a polycarbonate precursor, as mentioned above in the discussion of polycarbonate, and a bifunctional carboxylic acid conventionally used in manufacturing linear polyester. Examples of bifunctional carboxylic acids which may be used include aliphatic dicarboxylic acids, aromatic dicarboxylic acids, and aliphatic-aromatic dicarboxylic acids. These bifunctional carboxylic acids are well known, with an example being presented in the specification of U.S. Pat. No. 3,169,121. A typical example of such a bifunctional dicarboxylic acid is shown in the following formula:

$$R_1\text{—}(R_2)_x\text{—COOH}$$

In the formula, $R_1$ indicates a carboxyl group or hydroxyl group, $R_2$ is an alkyl group, an alkylidene group, an alicyclic group, an aromatic group (such as a phenylene group or biphenylene group), 2 or more aromatic groups connected via non-aromatic bonds (such as 2 phenyl groups connected by an alkylene group, an alkylidene group, etc.), or a bivalent alkyl group (such as a tolylene or xylylene group), and x is 1 when $R_1$ is a hydroxy group and 0 or 1 when $R_1$ is a carboxyl group.

Examples of preferred dicarboxylic acids include sebacic acid, didodecanoic acid, terephthalic acid, and isophthalic acid. Moreover, as an example of Component (A) (b), one may use a copolyester carbonate having the specific structure presented in Japanese Laid-Open Patent No. 2-249569.

Concerning the acrylic resin or methacrylic resin of Component (B), one may use an ordinary commercial injection molding material or extrusion molding material.

Moreover, commonly-known methods may be used to manufacture these acrylic resins and methacrylic resins. Examples include radical polymerization, block polymerization, solution polymerization, and suspension polymerization.

The acrylic resin and methacrylic resin are polymers or copolymers consisting of mixtures of at least one or more substances selected from among acrylic monomers and methacrylic monomers. Moreover, as a third component, a copolymer component, i.e., a styrene monomer such as styrene, alpha-methylstyrene, or p-methylstyrene, or a vinyl cyanide monomer such as acrylonitrile may also be included.

There are no particular restrictions on molecular weights of these resins, but a range from 1,000 to 2,000,000 is preferred, with a range of 10,000 to 300,000 being even more preferable.

Specific examples of acrylic monomers include methyl (meth)acrylate, ethyl(meth)acrylate, propyl(meth)acrylate, isopropyl(meth)acrylate, n-butyl acrylate, isobutyl acrylate, hexyl acrylate, octyl acrylate, and phenyl(meth)acrylate.

A specific example of the basic compound catalyst of Component (C) is an alkali metal and/or alkaline earth metal compound.

Organic acid salts, inorganic acid salts, oxides, hydroxides, hydrides, and alcoholates of the above-mentioned metals should preferably be used for this type of compound, and these compounds may be used either alone or in combination.

Specifically, examples of such alkali metal compounds include sodium hydroxide, potassium hydroxide, lithium hydroxide, cesium hydroxide, sodium bicarbonate, potassium bicarbonate, sodium carbonate, potassium carbonate, lithium carbonate, sodium acetate, potassium acetate, lithium acetate, sodium stearate, potassium stearate, lithium stearate, sodium hydroxyborate, lithium hydroxyborate, sodium phenoxyborate, sodium benzoate, potassium benzoate, lithium benzoate, disodium hydrogen phosphate, dipotassium hydrogen phosphate, dilithium hydrogen phosphate, disodium salts, dipotassium salts, and dilithium salts of bisphenol A, and sodium salts, potassium salts, lithium salts, and cesium salts of phenol, etc.

Furthermore, specific examples of the alkaline earth metal compound include calcium hydroxide, barium hydroxide, magnesium hydroxide, strontium hydroxide, calcium bicarbonate, barium bicarbonate, magnesium bicarbonate, strontium bicarbonate, calcium carbonate, barium carbonate, magnesium carbonate, strontium carbonate, calcium acetate, barium acetate, magnesium acetate, strontium acetate, and strontium stearate, etc.

In the present invention, the following basic compounds may be used as catalysts. For example, one may use a nitrogen-containing compound which decomposes readily or is volatile at high temperatures, with specific examples including ammonium hydroxides having alkyl, aryl, and araryl groups, such as tetramethylammonium hydroxide ($Me_4NOH$), tetraethylammonium hydroxide ($Et_4NOH$), tetrabutylammonium hydroxide ($Bu_4NOH$), and trimethylbenzylammonium hydroxide, tertiary amines such as trimethylamine, triethylamine, dimethylbenzylamine, and triphenylamine, secondary amines indicated by the formula $R_2NH$ (in the formula, R indicates an alkyl group such as methyl or ethyl or an aryl group such as phenyl or tolyl), primary amines indicated by the formula $RNH_2$ (in the formula, R has the same meaning as indicated above), imidazoles such as 2-methylimidazole and 2-phenylimidazole, or basic salts such as ammonia, tetramethylammonium borohydride ($Me_4NBH_4$), tetrabutylammonium tetraphenylborate ($Bu_4NBPh_4$), tetramethylammonium tetraphenylborate ($Me_4NBPh_4$), and tetramethylammonium acetate.

Of these substances, tetraalkylammonium hydroxides, particularly tetraalkylammonium hydroxides for electronic use which have a low content of metal impurities, are particularly preferable.

Lewis acid compounds can be mentioned as preferred examples of acidic compound catalysts. Specific examples of Lewis acid compounds include boron compounds such as $B(OPh)_3$, zinc borate, and boron phosphate, boric acid esters such as $B(OEt)_3$, $B(OCH_3)_3$, and $B(OPh)_3$, aluminum compounds such as aluminum stearate and aluminum silicate, zirconium compounds such as zirconium carbonate, zirconium alkoxide, and zirconium bicarbonate, gallium compounds such as gallium phosphate and gallium antimonide, germanium compounds such as germanium oxide and organogermanium compounds, tin compounds such as tetra- or hexaorganotin, tin oxalate, and dibutyltin, tin compounds such as $PhOSn(Bu)_2OSn(Bu)_2OPh$, antimony compounds such as antimony oxide and alkylantimony, bismuth compounds such as bismuth oxide and alkylbismuth, zinc compounds such as zinc acetate and zinc stearate, and titanium compounds such as alkoxytitanium and titanium oxide.

Moreover, in the above formulas, Ph indicates a phenyl group, Et an ethyl group, and Bu a butyl group.

These basic compound catalysts or acidic compound catalysts may be used individually or in combination. The basic compound catalyst and/or acidic compound catalyst should be used in the amount of 0.000005–0.5 parts by weight, and preferably 0.0000001–0.1 parts by weight, with respect to a total of 100 parts by weight of the above-mentioned Components (A) and (B). If a smaller amount is used, the desired effect of the invention will not be achieved, and if a larger amount is used, the desirable effects of color matching and thermal stability will not be achieved.

Moreover, in the present invention, when a basic compound catalyst is used, a neutralizing agent may be used in order to alleviate the adverse effect of the residual basic compound. Such adverse effects caused by residual basic compounds include discoloration and changes in molecular weight occurring during high temperature molding of the blend.

An acidic compound and/or a derivative thereof should preferably be used as a neutralizer. This should preferably be a Brønsted acid, an ester of an acidic compound, or a salt of an acid or base. This neutralizer should be added in the amount of 0.01–500 moles, and preferably 0.1–100 moles, or more preferably, 0.1–50 moles, with respect to 1 mole of the residual basic compound, and the amount of 0.5–30 moles is even more preferable.

Specific examples of Brønsted acid compounds include phosphoric acid, phosphorous acid, hypophosphorous acid, pyrophosphoric acid, polyphosphoric acid, boric acid, hydrochloric acid, hydrobromic acid, sulfuric acid, sulfurous acid, adipic acid, azelaic acid, α,(ω-dodecanedioic acid, L-ascorbic acid, aspartic acid, benzoic acid, formic acid, acetic acid, citric acid, glutamic acid, salicylic acid, nicotinic acid, fumaric acid, maleic acid, oxalic acid, benzenesulfinic acid, toluenesulfinic acid, and sulfonic acid compounds such as benzenesulfonic acid, p-toluenesulfonic acid, trifluoromethanesulfonic acid, naphthalenesulfonic acid, sulfonated polystyrene, and methyl acrylate-sulfonated styrene copolymer.

The ester of an acidic compound should preferably be an ester of an acidic compound containing a sulfur atom, phosphorus atom, etc. Specific examples of the ester of the acid containing a sulfur atom include compounds whose acid residue portion has a pKa value of 3 or less such as dimethyl sulfate, diethyl sulfate, methyl, ethyl, butyl, octyl, or phenyl esters of p-toluenesulfonic acid, methyl, ethyl, butyl, octyl, and phenyl esters of benzenesulfonic acid, etc.

Sulfonate compounds are particularly desirable as salts of acids and basis. The following compounds may be cited as examples of such sulfonate compounds.

Ammonium salts such as ammonium benzenesulfonate or ammonium p-toluenesulfonate, primary ammonium salts such as methylammonium benzenesulfonate, ethylammonium benzenesulfonate, propylammonium benzenesulfonate, methylammonium p-toluenesulfonate, ethylammonium p-toluenesulfonate, propylammonium p-toluenesulfonate, butylammonium p-toluenesulfonate, octylammonium p-toluenesulfonate, and phenylammonium p-toluenesulfonate, secondary ammonium salts such as dimethylammonium benzenesulfonate, diethylammonium benzenesulfonate, dipropylammonium benzenesulfonate, dimethylammonium p-toluenesulfonate, diethylammonium p-toluenesulfonate, dipropylammonium p-toluenesulfonate, dibutylammonium p-toluenesulfonate, dioctylammonium p-toluenesulfonate, and diphenylammonium p-toluenesulfonate, tertiary ammonium salts such as trimethylammonium benzenesulfonate, triethylammonium benzenesulfonate, tripropylammonium benzenesulfonate, trimethylammonium p-toluenesulfonate, triethylammonium p-toluenesulfonate, tripropylammonium p-toluenesulfonate, tributylammonium p-toluenesulfonate, trioctylammonium p-toluenesulfonate, and triphenylammonium p-toluenesulfonate, and quaternary ammonium salts such as tetramethylammonium benzenesulfonate, tetraethylammonium benzenesulfonate, tetrapropylammonium benzenesulfonate, tetramethylammonium p-toluenesulfonate, tetraethylammonium p-toluenesulfonate, tetrapropylammonium p-toluenesulfonate, tetrabutylammonium p-toluenesulfonate, tetraoctylammonium p-toluenesulfonate, and tetraphenylammonium p-toluenesulfonate.

As needed, moreover, an epoxy compound may be used together with the neutralizer. In this case, the epoxy compound is reacted with the acidic neutralizer added in excess in order to neutralize it. It should preferably be added in the amount of 0.0001–0.2 parts by weight, and more preferably, 0.001–0.1 parts by weight, with respect to a total of 100 parts by weight of the aforementioned Components (A) and (B).

Specific examples of this epoxy compound include epoxidized soybean oil, epoxidized linseed oil, phenyl glycidyl ether, and allyl glycidyl ether, but many other epoxy compounds may also be used. Moreover, these compounds may be used either individually or in combinations of 2 or more.

Methods for preparing the composition of the present invention, which is composed of Components (A) (a), (b), (B), and (C), include methods using Banbury mixers, extruders, kneaders, high-viscosity reactors (Hitachi, Ltd., spectacle blade reactors, lattice blade reactors, helicon reactors), etc.

Furthermore, pigments, dyes, inorganic fillers (glass fibers, carbon fibers, talc, wollastonite, clay, mica, etc.), flame retardants, thermal stabilizers (phosphite-class, hindered amine-class, etc.), UV absorbers (benzophenone-class, benzotriazole-class), mold-releasing agents, plasticizers, antistatic agents, impact-resistance-improving agents, etc., may also be used as optional ingredients.

EXAMPLES

The following is an explanation of the present invention in greater detail using examples, but the present invention is not limited by these examples. Moreover, the word "parts" used in the practical examples refers to parts by weight.

In the following presentation, the intrinsic viscosity (IV), terminal group ratio, and optical properties (optical transmittance, haze) of the polycarbonate were measured as follows.

Intrinsic viscosity (IV): Measured using an Ubbelohde viscosimeter in methylene chloride at 20° C.

Ratio of terminal groups: Measured by 13C-NMR as the ratio between phenolic terminal groups and hydroxyl groups.

Optical properties: Optical transmittance, haze: Measured on a press plate measuring 3 mm in thickness according to ASTM D 1003 using the Nihon Denshoku Kogyo NDH-200.

Example 1

0.44 kilomoles of bisphenol A (manufactured by Nihon G.E. Plastics K.K.) and 0.431 kilomoles of diphenyl carbonate (manufactured by Nihon G.E. Plastics K.K.) were placed in a 250-l tank-type agitation tank, and after nitrogen purging was carried out, they were dissolved at 140° C. Next, the temperature was increased to 180° C., and 0.11 moles of tetraammonium hydroxide were added and stirred for 30 minutes. After this, while the temperature was increased to 240° C., the pressure was reduced to 20 mmHg. While keeping temperature and pressure constant, the amount of distilled phenol was measured, and when the amount distilled became small, the reaction solution was fed into a biaxial horizontal-type agitation polymerization tank. After this, with the horizontal-type agitation polymerization tank at a temperature of 290° C. and a pressure of 0.2 mmHg, the reaction was allowed to continue for 60 minutes. The intrinsic viscosity (IV) of the polymer obtained was 0.5 dl/g, and its terminal hydroxyl group concentration was 70 mole %.

Example 2

Polymerization was carried out by the same method as in Example 1, except that 0.446 kilomoles of diphenyl carbonate was substituted. The intrinsic viscosity (IV) of the polymer obtained was 0.5 dl/g, and its terminal hydroxyl group concentration was 30 mole %. The results are shown in Table 1.

TABLE 1

| Example | Terminal hydroxyl group concentration (mole %) | Intrinsic viscosity (IV) (dL/g) | Optical transmittance | Haze |
|---------|----|-----|----|-----|
| 1 | 70 | 0.5 | 91 | 0.5 |
| 2 | 30 | 0.5 | 91 | 0.5 |
| Reference Example | 0 | 0.5 | 91 | 0.5 |

Reference Example

Using Lexan 141 (commercial name, manufactured by Nihon GE Plastics K.K.) powder, pelletization was carried out at 280° C. using a 40 mm monoaxial extruder. The intrinsic viscosity (IV) of the polymer obtained was 0.5 dl/g, and its terminal hydroxyl group concentration was 0 moles. These results are shown in Table 1.

Example 3

120 g of the polymer of Example 1 and 30 g of polymethyl methacrylate PMMA SUMIPEX, MH (commercial name, manufactured by Sumitomo Kagaku K.K.) was placed in a 500 ml glass reaction vessel equipped with a stirrer, and following nitrogen purging, the vessel was heated to 250° C. in a nitrogen atmosphere and stirring was begun. After this, 0.75 mg of sodium hydroxide was added, and the reaction was carried out for 4 hours. The physical properties of the polymer obtained are shown in Table 2.

Example 4

A reaction was conducted by the same method as in Example 3, except that 1.05 mg of potassium hydroxide was used instead of the sodium hydroxide used in Example 3. The physical properties of the polymer obtained are shown in Table 2.

Example 5

A reaction was conducted by the same method as in Example 3, except that 0.79 mg of lithium hydroxide (monohydrate) was used instead of the sodium hydroxide used in Example 3. The physical properties of the polymer obtained are shown in Table 2.

Example 6

A reaction was conducted by the same method as in Example 3, except that 5.98 mg of barium hydroxide (octahydrate) was used instead of the sodium hydroxide used in Example 3. The physical properties of the polymer obtained are shown in Table 2.

Example 7

A reaction was conducted by the same method as in Example 3, except that 15 mg of antimony trioxide was used instead of the sodium hydroxide used in Example 3. The physical properties of the polymer obtained are shown in Table 2.

TABLE 2

Comparison of physical properties according to effect of catalyst

| Example | PC/PMMA (mole %) | Catalyst | Optical transmittance | Haze |
|---------|-------|---------|----|----|
| 3 | 80/20 | NaOH | 90 | 0.5 |
| 4 | 80/20 | KOH | 90 | 0.5 |
| 5 | 80/20 | LiOH | 90 | 0.5 |
| 6 | 80/20 | BaOH | 55 | 33 |
| 7 | 80/20 | $Sb_2O_3$ | 50 | 60 |
| 8 | 80/20 | $TI(OBu)_4$ | 70 | 17 |
| 9 | 80/20 | $(Me)_4NOH$ | 90 | 0.5 |
| 10 | 80/20 | NaOH | 70 | 15 |
| 11 | 80/20 | NaOH, $Sn(COO)_2$ | 88 | 4 |
| 12 | 80/20 | $Bu_2SnO$ | 90 | 1 |
| Comparison Example 2 | 80/20 | None | 12 | 92 |
| Comparison Example 3 | 80/20 | None | 15 | 80 |
| Comparison Example 4 | 80/20 | None | 7 | 95 |

Example 8

A reaction was conducted by the same method as in Example 3 except that 15 mg of titanium butoxide was used instead of the sodium hydroxide used in Example 3. The physical properties of the polymer obtained are shown in Table 2.

Example 9

A reaction was conducted by the same method as in Example 3 except that 1.7 mg of tetramethylammonium hydroxide (TMAH) (0.017 ml of a 10% TMAH aqueous solution) was used instead of the sodium hydroxide used in Example 3. The physical properties of the polymer obtained are shown in Table 2.

Example 10

A reaction was conducted by the same method as in Example 3 except that 0.015 mg of sodium hydroxide was used instead of the 0.75 mg used in Example 3. The physical properties of the polymer obtained are shown in Table 2.

Example 11

A reaction was conducted by the same method as in Example 3, except that 0.015 mg of sodium hydroxide and 15 mg of tin oxalate were used instead of the 0.75 mg of sodium hydroxide used in Example 3. The physical properties of the polymer obtained are shown in Table 2.

Example 12

A reaction was conducted by the same method as in Example 3 except that 31.5 mg of dibutyltin oxide was used instead of the 0.75 mg of sodium hydroxide used in Example 3. The physical properties of the polymer obtained are shown in Table 2.

Example 13

A reaction was conducted by the same method as in Example 1, except that 120 g of the polymer of Example 2 was used instead of the polymer used in Example 1, and 0.015 mg of sodium hydroxide was used. The physical properties of the polymer obtained are shown in Table 3.

TABLE 3

Effect on physical properties according to terminal hydroxyl group concentration

| Example | PC/PMMA (mole %) | Terminal hydroxyl group concentration | Optical transmittance | Haze |
|---|---|---|---|---|
| 10 | 80/20 | 70 | 70 | 15 |
| 13 | 80/20 | 30 | 90 | 0.5 |
| Comparison Example 1 | 80/20 | 0 | 13 | 86 |

Example 14

75 g of the polymer of Example 1 and 75 g of PMMA, SUMIPEX MH (commercial name, manufactured by Sumitomo Kagaku K.K.) were placed in a 500 ml glass reactor equipped with a stirrer, the reactor was heated to 250° C., and stirring was begun. Next, after adding 31.5 mg of dibutyltin oxide, the reaction was allowed to proceed for 4 hours. The physical properties of the polymer obtained are shown in Table 4.

Example 15

A reaction was conducted by the same manner as in Example 14, except that 30 g of the polymer of Example 1 and 120 g of PMMA SUMIPEX MH (commercial name, manufactured by Sumitomo Kagaku K.K.) were substituted. The physical properties of the polymer obtained are shown in Table 4.

TABLE 4

Effect on physical properties according to molar ratio

| Example | PC/PMMA (mole %) | Terminal hydroxyl group concentration | Optical transmittance | Haze |
|---|---|---|---|---|
| 3 | 80/20 | 70 | 90 | 0.5 |
| 14 | 50/50 | 70 | 90 | 1.5 |
| 15 | 20/80 | 70 | 90 | 1.8 |
| PMMA | 0/100 | — | 92 | 1.8 |

Example 16

120 g of the polymer of Example 1 and 30 g of PMMA, SUMIPEX MH (commercial name, manufactured by Sumitomo Kagaku K.K.) were placed in a 500 ml glass reactor equipped with a stirrer, and after nitrogen purging, the reaction vessel was heated to 250° C. and stirring was begun. Next, after adding 0.75 mm of sodium hydroxide, the reaction was allowed to proceed for 4 hours, and after this, in order to neutralize the sodium hydroxide, 8.55 mg of butyl p-toluenesulfonate was added, and the reaction was allowed to proceed for an additional 30 minutes. The physical properties of the polymer obtained are shown in Table 5.

TABLE 5

Improvement in retention stability

| Example | PC/PMMA (molar ratio) | MFI Before retention | After retention[1] |
|---|---|---|---|
| 3 | 80/20 | 22.1 | 30.9 |
| 16 | 80/20 | 23.5 | 25.6 |

[1])Resin was retained in an injection molding machine at 280° C. for 15 minutes.

Example 17

2400 g of the polymer of Example 2, 600 g of PMMA, SUMIPEX MH (commercial name, manufactured by Sumitomo Kagaku K.K.), and 0.34 ml of TMAH 10% aqueous solution were blended and kneaded in a biaxial extruder (30 mm, L/D=30, 290° C.). The physical properties of the polymer obtained are shown in Table 6.

TABLE 6

Effect on physical properties of molar ratio of additive

| Example | PC/PMMA (mole %) | Additive | Optical transmittance | Haze |
|---|---|---|---|---|
| 17 | 80/20 | TMAH | 90 | 6 |
| 18 | 80/20 | Polymer of Example 1 | 50 | 48 |

Example 18

2400 g of the polymer of Example 2, 600 g of PMA, SUMIPEX MH (commercial name, manufactured by Sumitomo Kagaku K.K.) and 150 g of the polymer prepared in Example 1 were kneaded in a biaxial extruder (30 mm, L/D =30, 290° C.). The physical properties of the polymer obtained are shown in Table 6.

Comparison Example 1

A reaction was conducted by the same manner as in Example 3, except that 120 g of the polymer of Reference Example was used instead of the polymer of Example 1, which was used in Example 3. The physical properties of the polymer obtained are shown in Table 3.

Comparison Example 2

A reaction was conducted by the same manner as in Example 3, except that the sodium hydroxide added in Example 3 was not used. The physical properties of the polymer obtained are shown in Table 2.

Comparison Example 3

A reaction was conducted by the same manner as in Comparison Example 2, except that the polymer of Example 2 was used instead of the polymer of Example 1, which was used in Example 3. The physical properties of the polymer obtained are shown in Table 2.

Comparison Example 4

A reaction was conducted by the same manner as in Comparison Example 1, except that commercial polycarbonate not having terminal hydroxyl groups was used instead of the polymer of Example 1, which was used in Example 3. The physical properties of the polymer obtained are shown in Table 2.

The thermoplastic resin composition of the present invention provides the same high transparency as conventional resin compositions, and also provides improved thermal stability.

We claim:

1. A thermoplastic resin composition, comprising: A) 1–99 parts by weight of (a) a polycarbonate resin, or (b) a polyester carbonate resin; and B) 99–1 parts by weight of an acrylic or methacrylic resin; and (C) 0.000005–0.5 parts by weight of a basic compound catalyst or an acidic compound catalyst with respect to a total of 100 parts by weight of components A) and B); and 0.0001–0.2 parts by weight of an epoxy compound per 100 parts by weight of components A) and B).

2. The thermoplastic resin composition according to claim 1, wherein the polycarbonate resin and/or the polyester carbonate resin has an equivalent ratio of phenolic to non-phenolic terminal end groups of at least 1/19.

3. The thermoplastic resin composition according to claim 2, wherein component A) is a polycarbonate prepared by an ester exchange reaction of a bivalent phenol and a carbonic acid diester in a molten state.

4. The thermoplastic composition according to claim 3, wherein the bivalent phenol is bisphenol A.

5. The thermoplastic composition according to claim 4, wherein the carbonic acid diester is a diaryl carbonate.

6. The thermoplastic resin composition according to claim 5, wherein the diaryl carbonate is diphenyl carbonate.

7. The thermoplastic resin composition according to claim 1, wherein the component A) is a polyester carbonate.

8. The thermoplastic resin composition according to claim 1, wherein component B) is a methacrylic resin.

9. The thermoplastic resin according to claim 8, where the methacrylic resin is a polymer of methyl methacrylate.

10. The thermoplastic resin composition according to claim 1, wherein the catalyst of component C) is a basic compound.

11. The thermoplastic resin composition according to claim 10, wherein the basic compound is an alkali metal or an alkaline earth metal.

12. The thermoplastic resin composition according to claim 10, wherein the basic compound is a nitrogen-containing compound which decomposes readily or is volatile at high temperatures.

13. The thermoplastic resin composition according to claim 12, wherein the nitrogen-containing compound is an imidazole or a basic nitrogen-containing salt.

14. The thermoplastic resin composition according to claim 12, wherein the nitrogen-containing compound is a tetraalkylammonium hydroxide.

15. The thermoplastic resin composition according to claim 1, wherein the catalyst of component C) is an acidic compound.

16. The thermoplastic resin composition according to claim 15, wherein the acidic compound catalyst is a Lewis acid.

17. The thermoplastic resin composition according to claim 16, wherein the Lewis acid is a compound of an element selected from the group consisting of boron, aluminum, zirconium, gallium, germanium, tin, antimony, bismuth and zinc.

18. The thermoplastic resin composition according to claim 10, which further comprises an acidic compound as a neutralizer in the amount of 0.01–500 moles per mole of the basic compound catalyst.

19. A thermoplastic resin composition, comprising: A) 1–99 parts by weight of (a) a polycarbonate resin, or (b) a polyester carbonate resin; and B) 99–1 parts by weight of an acrylic or methacrylic resin; and C) 0.000005–0.5 parts by weight of an acidic compound catalyst with respect to a total of 100 parts by weight of components A) and B).

20. The thermoplastic resin composition according to claim 19, wherein the polycarbonate resin and/or the polyester carbonate resin has an equivalent ratio of phenolic to non-phenolic terminal end groups of at least 1/19.

21. The thermoplastic resin composition according to claim 20, wherein component A) is a polycarbonate prepared by an ester exchange reaction of a bivalent phenol and a carbonic acid diester in a molten state.

22. The thermoplastic composition according to claim 21, wherein the bivalent phenol is bisphenol A.

23. The thermoplastic composition according to claim 22, wherein the carbonic acid diester is a diaryl carbonate.

24. The thermoplastic resin composition according to claim 23, wherein the diaryl carbonate is diphenyl carbonate.

25. The thermoplastic resin composition according to claim 22, wherein the component A) is a polyester carbonate.

26. The thermoplastic resin composition according to claim 19, wherein component B) is a methacrylic resin.

27. The thermoplastic resin according to claim 26, where the methacrylic resin is a polymer of methyl methacrylate.

28. The thermoplastic resin composition according to claim 19, wherein the acidic compound catalyst is a Lewis acid.

29. The thermoplastic resin composition according to claim 28, wherein the Lewis acid is a compound of an element selected from the group consisting of boron, aluminum, zirconium, gallium, germanium, tin, antimony, bismuth and zinc.

30. The thermoplastic resin composition according to claim 19, wherein said composition further comprises 0.0001–0.2 parts by weight of an epoxy compound per 100 parts by weight of components A) and B).

31. A thermoplastic resin composition comprising: A) 1–99 parts by weight of a polyester carbonate resin; and B) 99–1 parts by weight of an acrylic or methacrylic resin; and C) 0.0 0005–0.5 parts by weight of a basic compound catalyst or an acidic compound catalyst with respect to 100 parts by weight of components A) and B).

32. The thermoplastic resin composition according to claim 31, wherein the polyester carbonate resin as an equivalent ratio of phenolic to non-phenolic terminal end groups of at least 1/19.

33. The thermoplastic resin composition according to claim 31, wherein component B) is a methacrylic resin.

34. The thermoplastic resin according to claim 33, where the methacrylic resin is a polymer of methyl methacrylate.

35. The thermoplastic resin composition according to claim 31, wherein the catalyst of component C) is a basic compound.

36. The thermoplastic resin composition according to claim 35, wherein the basic compound is an alkali metal or an alkaline earth metal.

37. The thermoplastic resin composition according to claim 35, wherein the basic compound is a nitrogen-containing compound.

38. The thermoplastic resin composition according to claim 37, wherein the nitrogen-containing compound is an imidazole or a basic nitrogen-containing salt.

39. The thermoplastic resin composition according to claim 37, wherein the nitrogen-containing compound is a tetraalkylammonium hydroxide.

40. The thermoplastic resin composition according to claim 31, wherein the catalyst of component C) is an acidic compound.

41. The thermoplastic resin composition according to claim 40, wherein the acidic compound catalyst is a Lewis acid.

42. The thermoplastic resin composition according to claim 41, wherein the Lewis acid is a compound of an element selected from the group consisting of boron, aluminum, zirconium, gallium, germanium, tin, antimony, bismuth and zinc.

43. The thermoplastic resin composition according to claim 35, which further comprises an acidic compound as a neutralizer in the amount of 0.01–500 moles per mole of the basic compound catalyst.

44. The thermoplastic resin composition according to claim 31, wherein said composition further comprises 0.0001–0.2 parts by weight of an epoxy compound per 100 parts by weight of components A) and B).

45. A thermoplastic resin composition comprising: A) 1–99 parts by weight of (a) a polycarbonate resin or (b) a polyester carbonate resin; B) 99–1 parts by weight of acrylic resin or methacrylic resin; and C) 0.000005–0.5 parts by weight of a basic compound catalyst with respect to a total of 100 parts by weight of components A) and B) and an acidic compound as a neutralizer in the amount of 0.01–500 moles per mole of the basic compound catalyst; and D) 0.0001–0.2 parts by weight of an epoxy compound per 100 parts by weight of components A) and B).

* * * * *